United States Patent
Hoff et al.

(10) Patent No.: US 7,466,983 B2
(45) Date of Patent: Dec. 16, 2008

(54) OVERLOAD PROTECTION IN PACKET COMMUNICATION NETWORKS

(75) Inventors: Per Magne Hoff, His (NO); Per Arne Olsen, Arendal (NO)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1569 days.

(21) Appl. No.: 09/943,211

(22) Filed: Aug. 30, 2001

(65) Prior Publication Data

US 2002/0034949 A1     Mar. 21, 2002

Related U.S. Application Data

(60) Provisional application No. 60/229,323, filed on Sep. 1, 2000.

(51) Int. Cl.
*H04Q 7/20*     (2006.01)

(52) U.S. Cl. ............... 455/445; 455/466; 370/230; 370/232; 370/235.1

(58) Field of Classification Search ........... 455/445, 455/466
See application file for complete search history.

(56) References Cited

U.S. PATENT DOCUMENTS

| | | | |
|---|---|---|---|
| 5,138,311 A | 8/1992 | Weinberg | |
| 5,390,299 A | 2/1995 | Rege et al. | |
| 5,475,870 A | 12/1995 | Weaver, Jr. et al. | |
| 5,479,481 A | 12/1995 | Koivunen | |
| 5,867,787 A | 2/1999 | Vudali et al. | |
| 5,912,884 A | 6/1999 | Park et al. | |
| 5,960,355 A * | 9/1999 | Ekman et al. | 455/456.1 |
| 5,970,412 A | 10/1999 | Maxemchuk | |
| 6,044,260 A | 3/2000 | Eaton et al. | |
| 6,233,458 B1 * | 5/2001 | Haumont et al. | 455/445 |
| 6,430,272 B1 * | 8/2002 | Maruyama et al. | 379/88.22 |
| 6,463,055 B1 * | 10/2002 | Lupien et al. | 370/353 |
| 6,529,497 B1 * | 3/2003 | Hjelm et al. | 370/347 |
| 6,591,301 B1 * | 7/2003 | Li et al. | 709/229 |
| 6,892,306 B1 * | 5/2005 | En-Seung et al. | 713/193 |

(Continued)

FOREIGN PATENT DOCUMENTS

JP     11-219298     8/1999

(Continued)

OTHER PUBLICATIONS

Granbohm, Håkan and Joakim Wiklund, "GPRS—General packet radio service", pp. 82-88, Ericsson Review No. 2, 1999, Sweden.

(Continued)

*Primary Examiner*—Duc Nguyen
*Assistant Examiner*—Matthew W Genack
(74) *Attorney, Agent, or Firm*—Michael Cameron

(57) ABSTRACT

Methods of handling messages at an interface in a communication system include the steps of receiving a message having an information element indicating the message's type, determining whether a frequency of receipt of messages of a predetermined type exceeds a threshold, handling the message in a normal way if the frequency does not exceed the threshold, and discarding the message if the frequency exceeds the threshold and the message is of the predetermined type. Such methods are useful in avoiding overloads after re-starts of serving GPRS support nodes or base station systems in packet-switched communication systems.

9 Claims, 7 Drawing Sheets

U.S. PATENT DOCUMENTS

| | | | |
|---|---|---|---|
| 6,898,425 B1 * | 5/2005 | Wilhelmsson et al. | 455/423 |
| 2004/0015937 A1 * | 1/2004 | Martinez et al. | 717/167 |

FOREIGN PATENT DOCUMENTS

| | | |
|---|---|---|
| JP | 2000-8884 | 1/2000 |
| WO | 93 19551 A1 | 9/1993 |
| WO | 97 08909 A1 | 3/1997 |
| WO | 99 23765 A2 | 5/1999 |

OTHER PUBLICATIONS

Ekeroth, Lars and Per-Martin Hedström, "GPRS support nodes", pp. 156-169, Ericsson Review No. 3, 2000, Sweden.

"Digital Cellular Telecommunications System (Phase 2 +)(GSM); General Packet Radio Service (GPRS); Base Station System (BSS)—Serving GPRS Support Node (SGSN); BSS GPRS Protocol (BSSGP)", GSM 08.18 ver. 6.7.1, Release 1997 (May 2000).

"Digital Cellular Telecommunications System (Phase 2 +) (GSM); Numbering, addressing and identification", GSM 03.03 ver. 6.5.0, Release 1997 (Mar. 2000).

"3rd Generation Partnership Project (3GPP); Technical Specification Group Services and System Aspects; General Packet Radio Service (GPRS); Service description; Stage 2", 3G TS 03.60 ver. 7.60 (Mar. 2001), Release 1998.

"3rd Generation Partnership Project (3GPP); Technical Specification Group Services and System Aspects; General Packet Radio Service (GPRS; Service Description; Stage 2", 3 GPP TS 23.060 ver. 3.3.0 Release 1999 (Apr. 2000).

* cited by examiner

OVERLOAD PROTECTION IN PACKET COMMUNICATION NETWORKS

This application claims priority to U.S. Provisional Patent Application No. 60/229,323 that was filed on Sep. 1, 2000, and that is incorporated here by reference.

BACKGROUND

This invention relates to methods and apparatus for telecommunication and in particular to packet-switched (PS) communication systems that are adapted to handle re-starts and re-allocation of system nodes.

In a packet data communication system, information is exchanged as packets of digital data, or datagrams. Each data packet includes address information that enables the system to direct each packet on its own way through the system from a sender to a receiver. Thus, a packet data communication system does not maintain a continuous connection between a sender and a receiver. Packet data communication systems are sometimes called "connection-less" and packet-switched systems, distinguishing them from traditional telephony systems in which continuous connections are established between senders and receivers. Thus, traditional telephony systems are sometimes called "connection-oriented" and circuit-switched (CS) systems.

General packet radio service (GPRS) is a packet-switched communication system that is standardized by the European Telecommunications Standards Institute (ETSI) and the Third Generation Partnership Project (3GPP). See for example "Digital Cellular Telecommunications System (Phase 2+) (GSM); General Packet Radio Service (GPRS); Service description; Stage 2", 3GPP TS 03.60 ver. 7.6.0 Release 1998; and "General Packet Radio Service (GPRS); Service Description; Stage 2", 3GPP TS 23.060 ver. 3.3.0 Release 1999 (Apr. 2000). GPRS is also described in H. Granbohm et al., "GPRS—General Packet Radio Service", *Ericsson Review* No. 2, pp. 82-88 (1999) and in L. Ekeroth et al., "GPRS Support Nodes", *Ericsson Review* No. 3, pp. 156-169 (2000).

GPRS operates with circuit-switched, cellular mobile telephone systems such as the Global System for Mobile (GSM) system, also standardized by ETSI and 3GPP, and the U.S. time division multiple access (TDMA) cellular system defined by the TIA/EIA-136 standard promulgated by the Telecommunications Industry Association (TIA) and Electronic Industries Association (EIA). By adding GPRS functionality to GSM and TDMA public land mobile networks (PLMNs), network operators can give their subscribers resource-efficient access to external Internet protocol-based (IP-based) packet data networks (PDNs) like the Internet.

As depicted in FIG. 1, a GSM-style PLMN includes a number of interconnected network nodes, in particular, a mobile switching center/visitor location register (MSC/VLR), a home location register (HLR), and base station systems (BSS). The BSS handles radio communication with subscribers' mobile stations (MSs) via an air interface Um. The HLR is a database of information about the subscribers that is accessed by the MSC/VLR via a D-interface and that is accessed by a serving GPRS support node (SGSN) via a Gr-interface. The MSC/VLR routes circuit-switched calls to and from the MSs, communicating with the BSS over an A-interface. It will be appreciated that these nodes are typical of a circuit-switched network such as a PLMN, whether GSM or not. Data transfer and signaling interfaces are indicated in FIG. 1 by solid lines and signaling interfaces are indicated by dashed lines.

Packet data services and GPRS add nodes in a packet-switched portion of the communication network for handling packet data traffic; these nodes interwork with the circuit-switched portion of the communication system depicted in FIG. 1. For example, an SGSN is connected to the BSS via a Gb-interface and resides at the same hierarchical level in the network as the MSC/VLR. A gateway GPRS support node (GGSN) is the interconnection point to a packet data network via a Gi-interface and is connected to the SGSN via a Gn-interface (which may be an IP backbone). User data to the Internet, directed for example, from a terminal equipment (TE) connected to a mobile terminal (MT), is sent encapsulated over the IP backbone. In FIG. 1, R is a reference point between a non-ISDN compatible TE and an MT. In this application, the end-user's equipment is called a mobile station (MS) whether it is a combination of a phone (MT) and a device such as a computer (TE) or just a phone.

The SGSN and GGSN can be combined into one physical node and deployed at a central point in the network, or a network may include several GGSNs and SGSNs as shown. Packet data streams and short text messages are handled in FIG. 1 by a Short Message Service—Gateway MSC (SMS-GMSC) and an SMS—Interworking MSC (SMS-IWMSC) that communicate with the HLR via a C-interface and with the MSC/VLR via an E-interface. As seen in FIG. 1, the SMS-GMSC and SMS-IWMSC exchange short messages with a short message switching center (SM-SC), and the SMS-GMSC communicates with the SGSN via a Gd-interface. It will be appreciated that the nodes depicted in FIG. 1 are typical of a packet-switched network, whether a GPRS network or not. It will also be appreciated that some networks physically split node(s) into control plane node(s) and user plane node(s) in order to enable independent scalability of signaling traffic and data traffic, among other reasons.

Most of the interfaces depicted in FIG. 1, and in particular the Gs- and A-interfaces, exchange messages with the help of the Signaling System Number 7 (SS7) that is standardized by ETSI and the American National Standards Institute (ANSI), among others. SS7 in GSM and GPRS uses a message transfer part (MTP) protocol to deliver messages and a signaling connection control part (SCCP) protocol for extended addressing. The SCCP protocol provides for each message to have an SCCP header that has a sub-system number for telling the node receiving the message which application should have the message. An SGSN, for example, typically has different sub-system numbers for communication with the HLR and with the MSC/VLR. An MSC usually derives the node type of a communicating peer node based on the sub-system number that may be stored in a database or included in an earlier message.

In a GPRS network, packet data channels (PDCHs) are mapped onto respective timeslots, thereby utilizing the same physical channel structure as ordinary circuit-switched GSM/TDMA channels. All radio resources are managed from a base station controller (BSC) in the BSS, which also includes Base Transceiver Stations (BTS); the pool of physical channels for a given cell can be used as either circuit-switched channels or packet-data channels. By packet multiplexing, the allocated PDCHs can be shared by every GPRS user in the cell, and the number of PDCHs in a cell can be fixed or dynamically allocated to meet fluctuating traffic demands. To support efficient multiplexing of packet traffic to and from mobile stations, or mobile terminals (MTs), packet data traffic channels (PDTCHs), packet associated control channels (PACCHs), and packet data common control channels (PDCCHs) are specified for the air interface Um, although PDCCHs are not always used.

As noted above, an SGSN serves every GPRS subscriber that is physically located within the SGSN's service area. To a large extent, the SGSN does for packet-switched service what the MSC/VLR does for circuit-switched service. The mobility management functions for GPRS terminals that are performed by an SGSN include attach/detach, user authentication, ciphering, location management, and so on, and an SGSN supports combined mobility management for at least some mobile terminals by interworking with the MSC/VLR. An SGSN also manages the logical link to mobile terminals that carries user packet traffic, SMS traffic, and layer-3 signaling between the network and the GPRS terminals. An SGSN also routes and transfers packets between mobile terminals and the GGSN; handles packet data protocol (PDP) contexts (the PDP context defines important parameters, such as the access point name, quality of service, the GGSN to be used, and so on, for connection to the external packet data network); interworks with the radio resource management in the BSS; and generates charging data.

As noted above, the GGSN accommodates the interface to external IP-based networks. Access-server functionality in the GGSN is defined according to standards from the Internet Engineering Task Force (IETF). The GGSN functions as a border gateway between the PLMN and external networks, sets up communication with external packet data networks, authenticates users to external packet networks, routes and tunnels packets to and from the SGSN, and generates charging data.

The MSC/VLR also supports integrated mobility management for mobile terminals. GPRS attach and PDP-context activation must be executed in order for GPRS users to connect to external packet data networks. The mobile terminal makes itself known to the network by means of GPRS attach, which corresponds to IMSI attach used for circuit-switched traffic. Once the terminal is attached to the network, the network knows its location and capabilities. For some mobile terminals, circuit-switched IMSI attach and packet-switched GPRS attach can be performed at the same time.

GPRS attach is depicted by FIG. 2. In step 1, the mobile terminal requests that it be attached to the network. The terminal's request, which is sent to the SGSN, includes parameters that indicate its multi-timeslot capabilities, the ciphering algorithms it supports, whether it wants to attach to a packet-switched service or to both packet- and circuit-switched services, etc. In step 2, authentication is made between the terminal and SGSN, which may fetch relevant data from the HLR. In step 3, subscriber data from the HLR is inserted into the SGSN; and in step 4, information is passed to the terminal that indicates the terminal is attached to the network.

Before the mobile terminal can communicate with an external PDN (e.g., an IP network), a PDP context must be activated. The PDP context includes parameters that describe the characteristics of the connection to the external PDN, e.g., the address allocated to the MS, access point name (APN), quality of service (QoS), and so on. PDP contexts may be primary or secondary, in which a secondary PDP context uses the same MS IP address and is connected towards the same APN (i.e., external net) as its respective primary PDP context. A composite PDP context contains one primary and zero or more secondary PDP contexts.

PDP-context activation is depicted in FIG. 3. In step 1, the mobile terminal requests PDP-context activation. In step 2, the SGSN validates the request based on subscription information received from the HLR during GPRS attach. In step 3, the APN is sent to a domain name server (DNS) from the SGSN to find the IP address of the relevant GGSN. In step 4, a logical connection is created between the SGSN and the GGSN (i.e., a GPRS Tunneling Protocol (GTP) tunnel is formed). In step 5, the GGSN assigns a dynamic IP address to the mobile terminal, if required, from the range of IP addresses allocated to the PLMN or externally, from a Remote Authentication Dial-In User Service (RADIUS) server (a fixed IP address from the HLR could also be used). A RADIUS client is included in the GGSN to support Password Authentication Protocol (PAP) and Challenge Handshake Authentication Protocol (CHAP) authentication to external networks with RADIUS servers. After an acknowledgment of the PDP context activation is returned to the MS (step 6), communication between the user and the external PDN (e.g., an Internet Service Provider (ISP) network or a corporate network) can commence (step 7).

In GPRS, establishing a PDP context signifies establishing a communication session in an MS, the radio network, an SGSN, and a GGSN. In addition, GPRS includes a "heartbeat" mechanism implemented by Echo Request and Echo Response messages that every node/entity sends to all of its communication peers over the Gn- and Gp-interfaces, and if a reply is received and a re-start counter of the peer is different from the previously received counter value, the peer is considered re-started.

SUMMARY

Applicants describe methods of handling messages at an interface in a communication system that include receiving messages having an information elements indicating message type, determining whether a frequency or volume of receipt of messages of a predetermined type exceeds a threshold, handling the messages in a normal way if the frequency does not exceed the threshold, and discarding the messages if the frequency exceeds the threshold and the messages are of the predetermined type. Such methods are useful in avoiding overloads after re-starts of serving GPRS support nodes or base station systems in packet-switched communication systems.

This method may be carried out by an SGSN or a BSS after a re-start of the SGSN or BSS. Also, the message type may be a local temporary logical link identity, and messages of types other than the predetermined type are handled in the normal way even when the frequency exceeds the threshold. The method may further include the step of determining whether a frequency of receipt of messages of a plurality of types exceeds a second threshold; if it does, the other steps of the method are carried out, but if it does not, a message is handled in the normal way.

According to another aspect, Applicants provide a method of handling messages at an interface in a communication system that includes the steps of receiving an uplink message and reading an information element in a header of the received message; accessing a table based on the read information element to determine a status of the read information element as either already known or unknown; and based on the table access, handling the message in a normal way if the information element is known. If the information element is unknown, the following steps are carried out: updating a frequency of receipt of unknown read information elements; comparing the updated frequency to a threshold; and if the updated frequency is less than the threshold, handling the message in the normal way. If the updated frequency is not less than the threshold, the following steps are carried out: determining whether the read information element is of a predetermined type; if the read information element is not of the predetermined type, handling the message in the normal way, and if the read information element is of the predetermined type, discarding the message.

This method may be carried out in an SGSN or a BSS after a re-start of the SGSN or BSS, and the information element may be a temporary logical link identity. Also, the threshold may be based on processing resources available in the SGSN for handling messages, and the processing resources may include an amount of free memory left to the SGSN and/or a load on a central processing unit of the SGSN. This method may further include the step of determining whether the message includes a second information element that is encrypted, with this step being carried out if the updated frequency does not exceed the threshold and before handling the message in the normal way; if the second information element is not encrypted, the message is handled in the normal way, but if the second information element is encrypted, the message is discarded.

This method may also include comparing, if the information element is not of the predetermined type, a frequency of receipt of messages having information elements of another type to a second threshold, where if the second threshold is not exceeded, the message is handled in the normal way, but if the second threshold is exceeded, the message is discarded. Such a method may further include the step of determining whether the message includes a second information element that is encrypted, this step being carried out if the frequency does not exceed the second threshold and before handling the message in the normal way; if the second information element is not encrypted, the message is handled in the normal way, but if the second information element is encrypted, the message is discarded.

The method may further include the step of determining whether a frequency of receipt of messages of a plurality of types exceeds a second threshold; if the frequency exceeds the second threshold, the other steps of the method are carried out, but if the frequency does not exceed the second threshold, a message is handled in a normal way.

BRIEF DESCRIPTION OF THE DRAWINGS

The features, objects, and advantages of this invention will be apparent from reading this description in conjunction with the drawings, in which.

DETAILED DESCRIPTION

This description is given in terms of GPRS for convenience only, and it will be appreciated that the principles of the invention can be applied in other packet-switched networks having suitable characteristics.

If an SGSN has to be re-started for some reason, e.g., due to hardware or software problems, the SGSN loses all information regarding its attached MSs (i.e., state, encryption triplets, etc.). MSs attached to a re-started SGSN are not typically notified about the re-start, so in the course of re-starting (especially during a busy time of day), the SGSN receives communications from a large portion of the (formerly attached) MSs. The volume of communications can easily overwhelm the message processing capabilities of the SGSN, leading to another re-start (cyclic re-start) and a possible vicious circle since the MSs still will be unaware that the SGSN has re-started.

Figure 1:
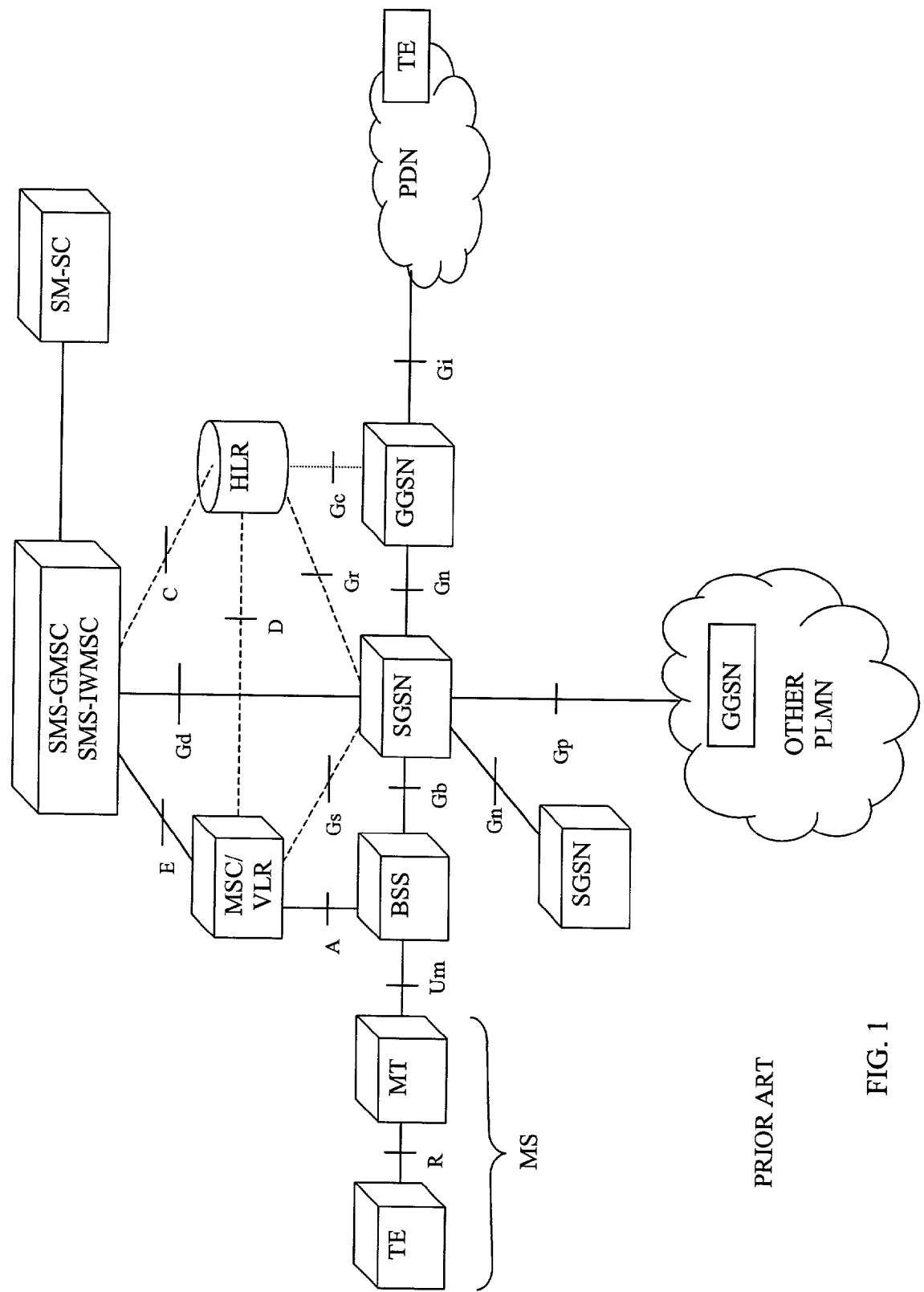
FIG. 1 depicts a combined packet-switched and circuit-switched communication network.
Figure 2:
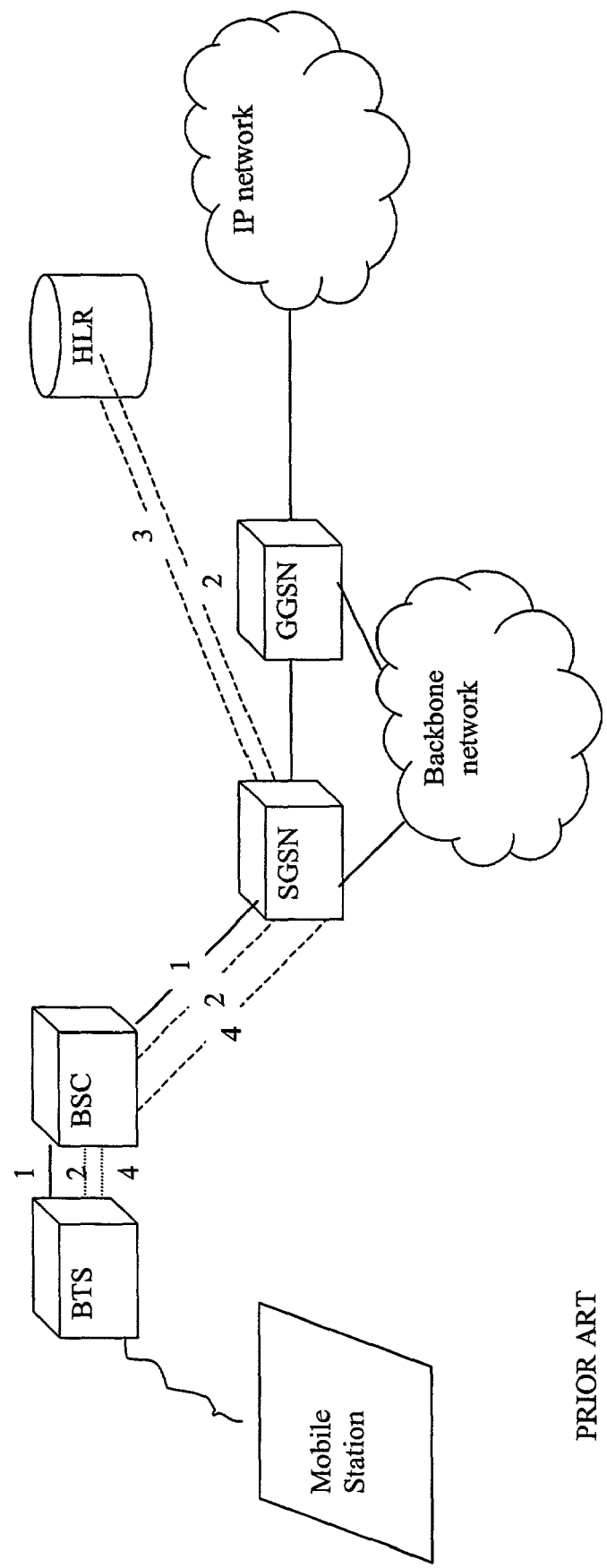
FIG. 2 depicts a simplified GPRS attach in a packet-switched network.
Figure 3:
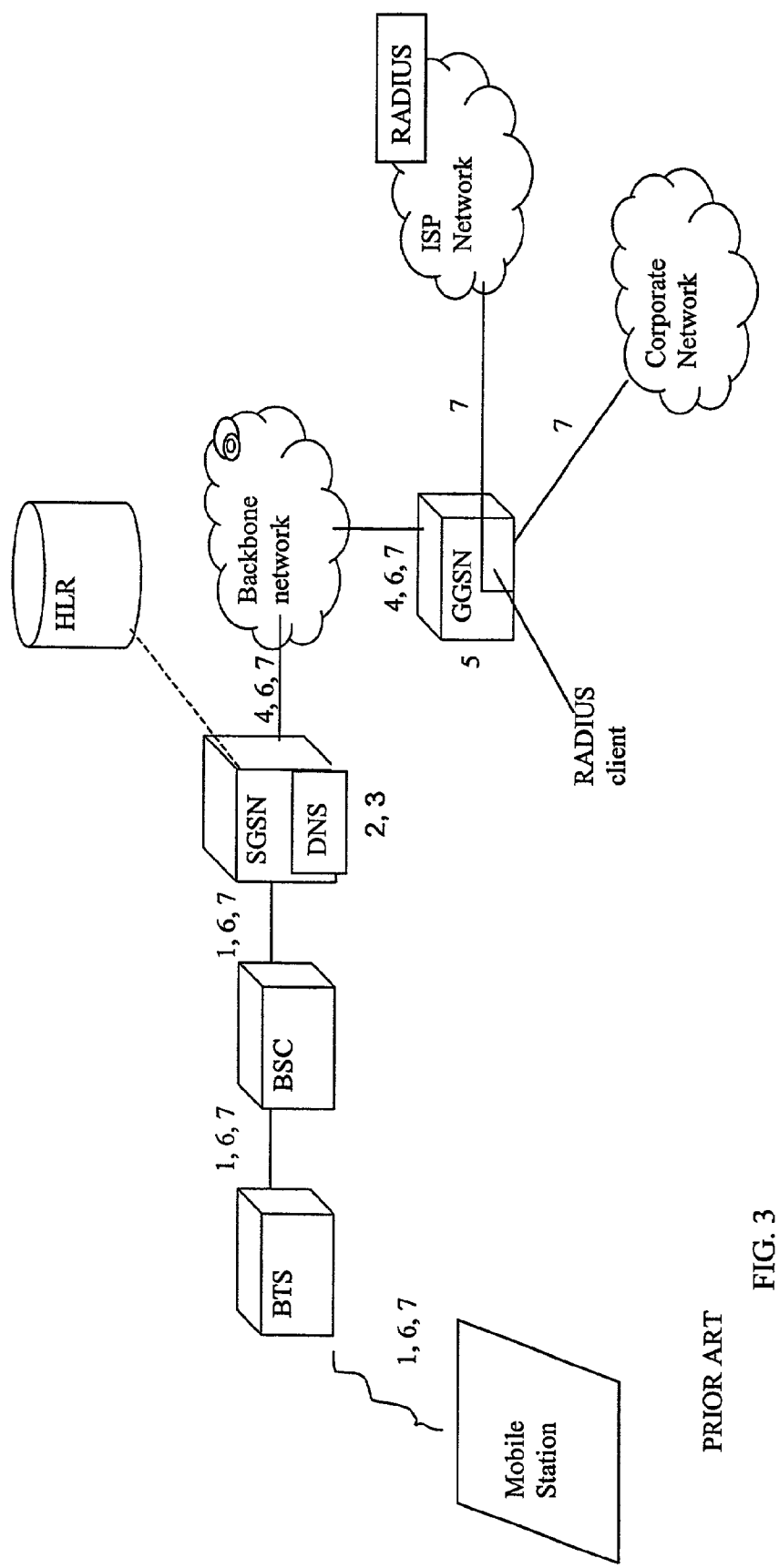
FIG. 3 depicts a simplified PDP context activation in a packet-switched network.
Figure 4:
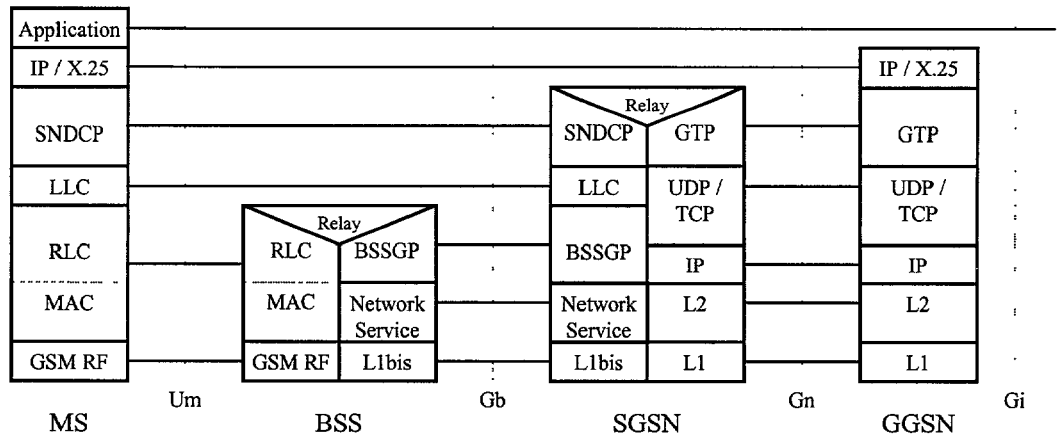
FIG. 4 depicts the BSSGP protocol stack for payload in GPRS.
Figure 5:
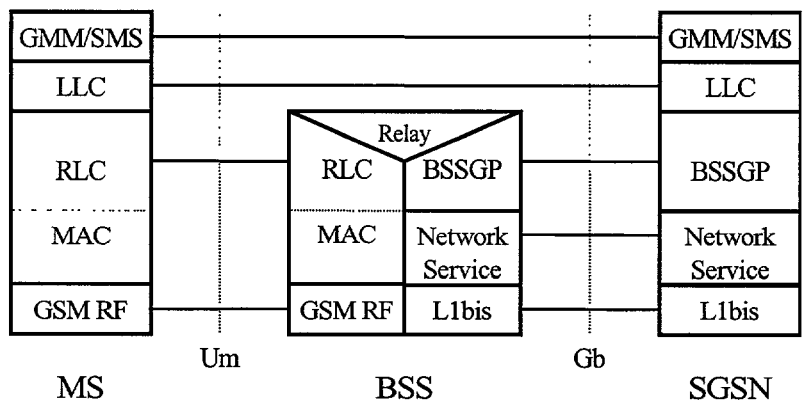
FIG. 5 depicts the BSSGP protocol stack for MS-SGSN signaling in GPRS.

When the Gb-interface between the BSS and SGSN is restored, all types of MS-originated communications arrive at the SGSN. These communications include GPRS MM and session management (GMM) messages such as attach-request messages, periodic Routing Area messages (the MS has not changed RA), Routing Area update messages (the MS has entered a new RA), and other MM messages. These communications also include MS-originated SMS messages, MS-originated payloads, and signaling messages, e.g., parameter negotiation (XID) and other messages according to logical link control (LLC) and subnetwork dependent convergence (SNDC) protocols. FIGS. 4 and 5 show the BSSGP protocol in its correct environment within the GPRS.

FIG. 4 shows the protocol stacks used for payload (e.g., IP packets) and FIG. 5 shows the protocol stacks involved in MS-SGSN signaling, e.g., sending SMS messages. The organizations of these figures will be recognized as conforming to the OSI model. As can be seen from FIGS. 4 and 5, the Gb-interface between the SGSN and BSS employs a L1bis protocol for messages on the lowest layer, layer 1 (L1); a network service protocol for messages on layer 2 (L2); and a BSS GPRS protocol (BSSGP) for messages on layer 3 (L3). Other interfaces and layers are shown in FIGS. 4 and 5 for completeness, and include a radio frequency (RF) protocol, medium access control (MAC), and radio link control (RLC) protocols for L1, L2, and L3, respectively, of the air interface Um, which may be a GSM interface, and L1, L2, and IP protocols for the Gn-interface between an SGSN and a GGSN. It can be seen from the figures that these entities communicate on higher layers according to appropriate protocols, such as the user datagram protocol and transmission control protocol (UDP/TCP) and the IP and X.25 protocols.

When a message from a not-attached MS (even from an MS which still believes it is attached) is received by the SGSN (i.e., the BSSGP layer), the message must be treated as an attach-request message, at least until it is determined that the message was something else. If it is determined that the message was something else, a "detach request with request to re-attach" message is sent from the SGSN to the MS. After a re-start, processing power in the layers higher than the BSSGP layer (L3) must be used to determine the types of messages actually sent by the MSs.

Since the typical approach requires so much processing power that it is unacceptable when the volume of "unknown" MSs is high, Applicants have recognized that it is possible to use the fact that the BSSGP layer is the lowest layer of the Gb-interface in which an individual MS is identified to reduce the necessary processing power and facilitate SGSN re-starts.

"Digital Cellular Telecommunications System (Phase 2+) (GSM); General Packet Radio Service (GPRS); Base Station System (BSS)—Serving GPRS Support Node (SGSN); BSS GPRS Protocol (BSSGP)", 3GPP TS 08.18 ver. 6.7.1 Release 1997 (May 2000) specifies a temporary logical link identity (TLLI) that identifies a specific MS. According to section 10.2.1 of the BSSGP specification, the TLLI is a mandatory information element in a UNITDATA protocol data unit (PDU) that is sent according to the BSSGP in the uplink (UL), i.e., from the BSS to the SGSN. TLLIs can have four types: 1) local TLLI, 2) foreign TLLI, 3) random TLLI, and 4) auxiliary TLLI, as specified by "Digital Cellular Telecommunications System (Phase 2+) (GSM); Numbering, addressing and identification", 3GPP TS 03.03 ver. 6.5.0 Release 1997 (March 2000).

The usage of the four types of TLLI is specified in section 4.7.1.4 of "Digital Cellular Telecommunications System (Phase 2+) (GSM); Mobile Radio Interface Layer 3 Specification", 3GPP TS 04.08 ver. 6.10.0 (6.a.0) Release 1997 (April 2000). A local TLLI is used by the MS in all UL PDUs after a successful GPRS attach, including "periodic Routing Area update" messages. A foreign TLLI is used by the MS during GPRS attach and when the MS enters a new Routing Area. A random TLLI is used when the MS does not have a TLLI from a previous attach (so-called IMSI attach). An auxiliary TLLI might be used by the BSSGP layer, although it is used by the GMM layer only when the MS requests an anonymous PDP context as specified in section 6.1.3.4.1 of the mobile radio interface layer 3 specification. It can be noted from the specifications cited above that anonymous PDP contexts have been removed from Release 1999 of GPRS, and so auxiliary TLLIs need not be further discussed here.

In accordance with one aspect of Applicants' invention, the SGSN is programmed or otherwise configured such that during re-start, the BSSGP layer in the SGSN accepts uplink UNITDATA PDUs having either foreign or random TLLIs (i.e., new GPRS attaches) and silently discards uplink UNITDATA PDUs having local TLLIs (i.e., all other messages, such as periodic Routing Area messages, payload, and SMS). A (formerly attached) MS that has sent a UNITDATA PDU having a local TLLI will retransmit it, perhaps a number of times, but eventually the MS will quit and perform a new GPRS attach with a foreign TLLI.

It will be appreciated that it is not necessary for an SGSN to be configured such that the SGSN always discards uplink UNITDATA PDUs having local TLLIs. Always discarding such PDUs simplifies the operation of the SGSN to some extent. On the other hand, always throwing away PDUs having local TLLIs increases the time needed to re-attach all formerly attached MSs, and MSs that are actively interchanging payloads when the SGSN re-starts need longer times to determine that the problem is the GPRS core network, not a "slow Internet". In other words, it will take longer for an MS to detect that it has been "thrown out" of an SGSN. For a connection between an MS terminal equipment (TE) and an external PDN that uses TCP, the MS TE reports to its application that "I am giving up" when the TCP layer at the MS side quits re-sending an uplink TCP packet. It is then impossible for the MS end-user (e.g., a human) to judge whether the problem was in the GPRS core network or in the PDN, so the end-user would then try to attach again manually.

Rather than always discarding PDUs having local TLLIs after a re-start, the SGSN can be more selective, determining when it should discard such PDUs, and thus provide faster, automatic re-attachment and re-activation of MSs, and SGSN protection against overloads and assurance of acceptable levels of in-service performance (uptime). In other words, the SGSN can be configured to have at least two re-start states in the BSSGP layer in the SGSN, a first state in which PDUs having local TLLIs are not discarded and a second state in which they are. To determine which state the SGSN should be in, the BSSGP layer preferably monitors the reception frequency or volume of messages having "unknown TLLI (of all types)". When this frequency or volume is greater than a threshold level that reflects the processing capabilities of the SGSN, the BSSGP layer enters the second re-start state and discards "unknown MSs with local TLLI". When the frequency or volume of unknown TLLIs is less than the threshold level, the BSSGP layer enters the first state, normally handling and accepting "unknown MSs with Local TLLI". It will be understood that the terms "frequency" and "volume" are used interchangeably in this application because these parameters are mutually related, and it is not significant which parameter is monitored.

Figure 6A:
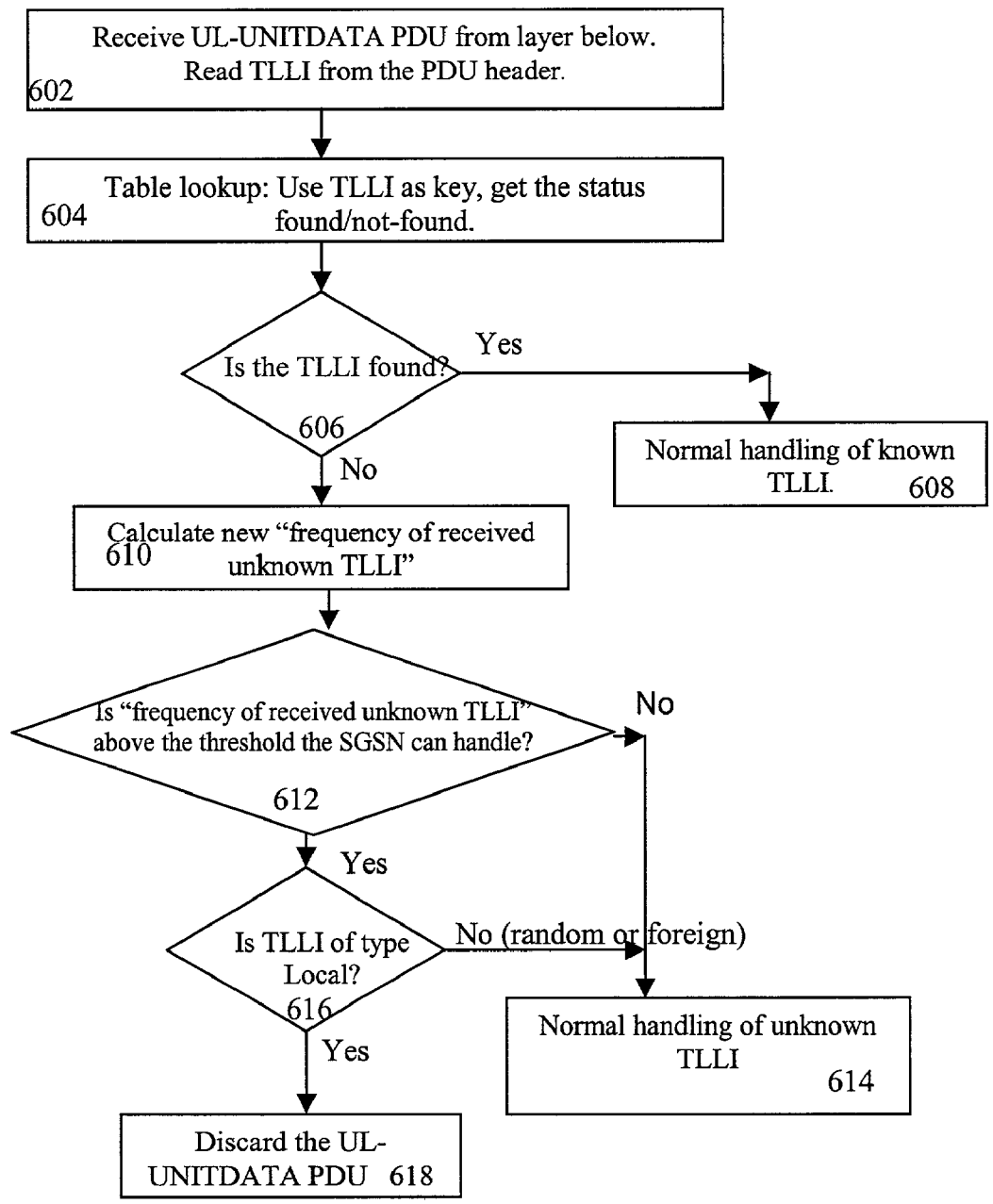
FIGS. 6A, 6B, 6C are flowcharts of methods in accordance with aspects of this invention.
Figure 6B:
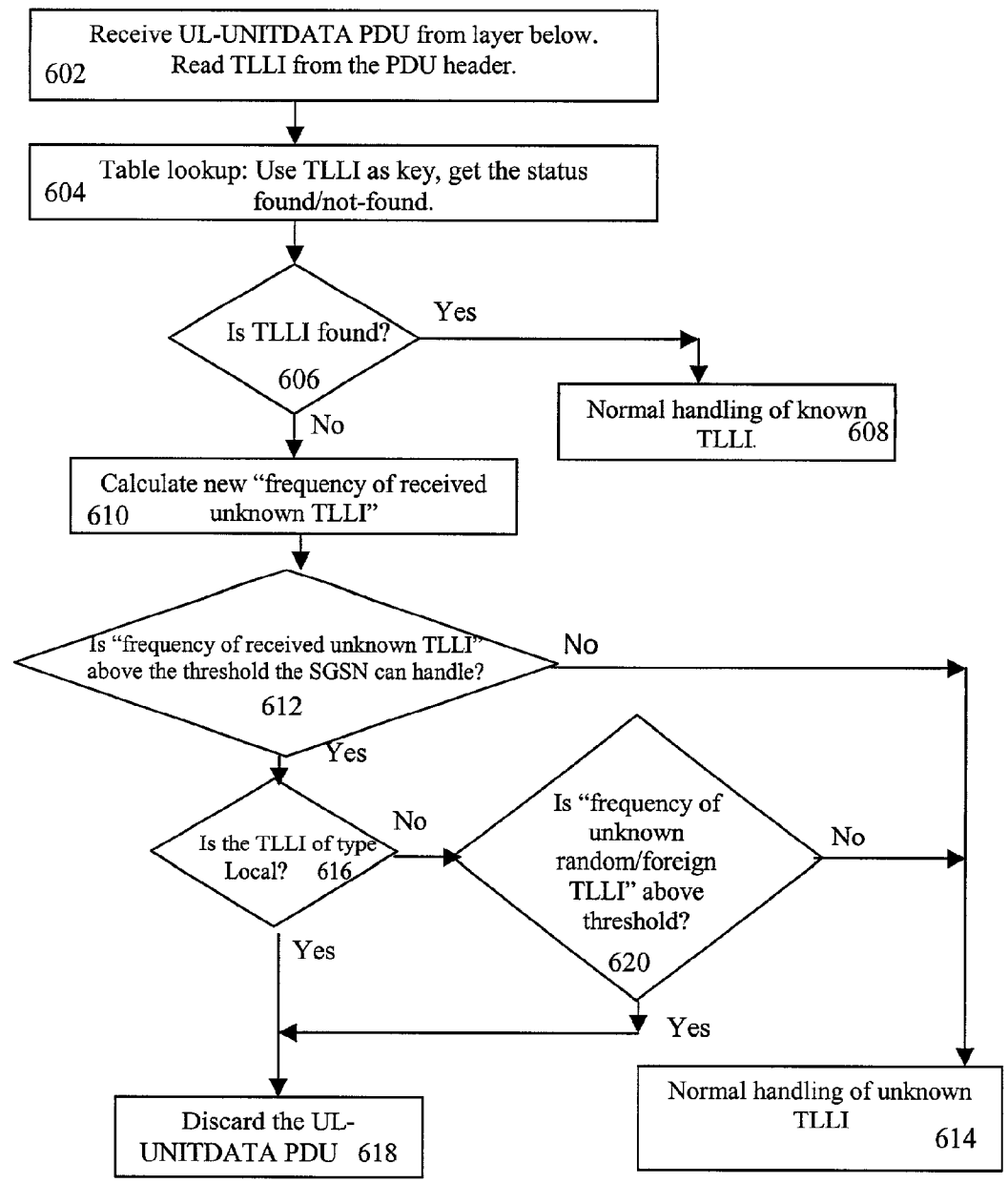
Figure 6C:
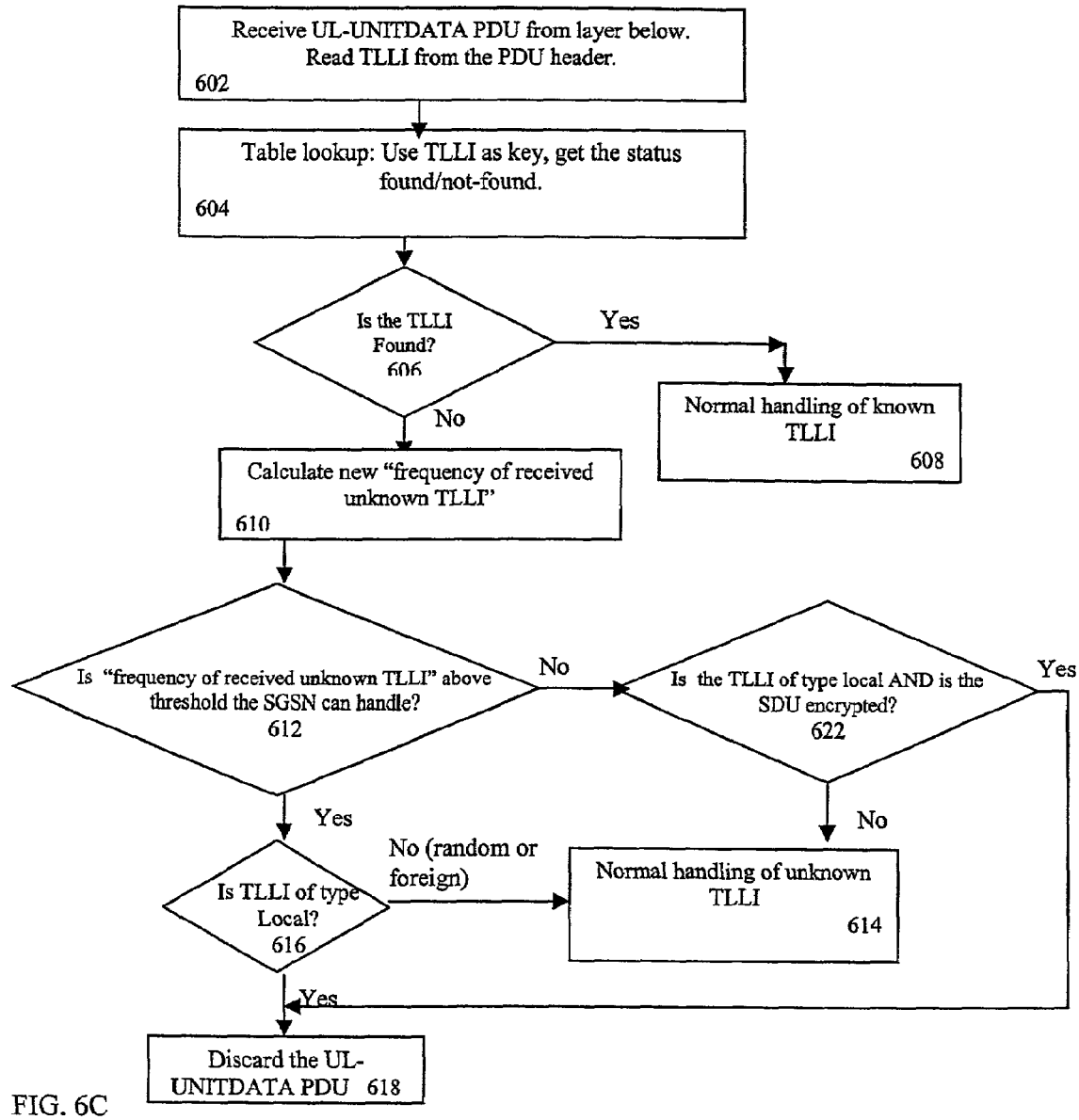

FIGS. 6A, 6B, 6C are flowcharts of methods in accordance with aspects of Applicants' invention that are implemented in a SGSN in the communication network. Referring to FIG. 6A in step 602, the BSSGP layer (L3) in the SGSN receives an uplink UNITDATA PDU from a lower layer (L2 or L1) and reads the received TLLI in the header of the received PDU. In step 604, the SGSN uses the received TLLI as a key, address, or other indicator to access a table or other database that indicates the status of the received TLLI as either already known (e.g., from an already received PDU) or unknown to the SGSN. Based on the table look-up (step 606), the SGSN handles the received PDU in the normal way if the TLLI is known (step 608). Otherwise, the SGSN updates a counter or other suitable mechanism that indicates the frequency or volume of unknown received TLLIs (step 610) and then compares the updated frequency or volume to a threshold that is based on the processing power available for handling PDUs having unknown TLLIs (step 612).

If processing resources are still available, e.g., if the updated frequency or volume is less than the threshold, the PDU is handled in the normal way, with the SGSN sending an appropriate response to the PDU (step 614). On the other hand, if processing resources are not available, the received TLLI is examined to determine whether it is a local TLLI (step 616). If it is not local, i.e., if it is either foreign or random (the PDU is a new GPRS attach), the PDU is handled in the normal way, but if it is local, the received PDU is discarded without sending a response (step 618).

It will be understood that the method depicted in FIG. 6A relates availability of SGSN or similar processing resources to the threshold since such resources can be scarce during re-start, and possibly during other circumstances, such as a BSS re-start (after which the frequency of uplink PDUs having foreign TLLIs may be high since MSs detect the BSS re-start and have to re-attach), it may be useful to discard PDUs having particular types of TLLIs. Processing resources can be measured in many ways, including for example the amount of free memory left to the SGSN and/or the load on the SGSN's central processing unit (CPU). It should also be understood that it can be useful to discard or change the handling of PDUs having foreign/random TLLIs, and a method for doing so is depicted in FIG. 6B. The methods depicted in FIGS. 6A, 6B have many common steps, which are indicated by common reference numerals and need not be described again.

In FIG. 6B, however, another threshold decision step 620 is carried out for the NO result of the decision at step 616. If a TLLI is not local, i.e., if it is either foreign or random (the PDU is a new GPRS attach or Routing Area update), the SGSN compares an updated frequency or volume of received unknown random/foreign TLLI to a threshold that may also be based on the processing power available for handling PDUs having unknown TLLIs (step 620). This frequency or volume of received unknown random/foreign TLLI parameter can be maintained and updated in a manner substantially similar to the manner of maintaining the frequency or volume of received unknown TLLI that is described in connection with FIG. 6A. If the threshold is not exceeded, the PDU is handled in the normal (step 614), but if the threshold is exceeded, the received PDU is discarded without sending a response (step 618).

Applicants have also found that operation of an SGSN can be assisted even when the SGSN is not overloaded. For example, in steps 608, 614, if the SGSN determines that the received PDU contains an encrypted, or enciphered, service data unit (SDU), the SGSN replies with a detach-with-request-to-re-attach message that is unencrypted (i.e., in plaintext). The SGSN is not able to decrypt the received PDU due to unavailability of vital state information and is also not able to encrypt its reply for the same reason. Nevertheless, section 4.7.1.2 of the Mobile Radio Interface Layer 3 Specification requires that such reply messages must be encrypted. As a result, each MS decides on its own whether to accept an unencrypted detach-with-request-to-re-attach message. If the MS rigorously adheres to security standards, the MS discards the SGSN's message, and thus continues to believe that it is attached to the SGSN when it is not. Stated another way, the SGSN tries to help the MS re-attach more quickly, but the MS refuses the help. Rather than permit this to occur, the SGSN advantageously discards such an uplink UNITDATA PDU.

It will be understood that the knowledge of whether a PDU is encrypted or not can be located at the BSSGP layer, in particular in the BSSGP SDU. All that is needed is for the BSSGP layer to understand the protocol layout of the layer above it, i.e., how to read the LLC header. This is easy to implement, although it is an unconventional configuration.

Accordingly, FIG. 6C shows the method depicted in FIG. 6A with another decision step 622 that is carried out for the NO result of the decision at step 612. If an unknown TLLI is local, i.e., if it is neither foreign nor random (the PDU is not a new GPRS attach nor Routing Area update), the SGSN determines whether the SDU associated with the received unknown local TLLI is encrypted. If the determination is No, the PDU is handled in the usual way (step 614), but if the determination is Yes, the received PDU is discarded without sending a response (step 618).

It will be understood that the decision step 622 can also be added to the method depicted in FIG. 6B.

Applicants' invention enables an SGSN to be protected from overload due to large message volume during re-start by arranging for only new attaches to be taken care of in the SGSN. Filtering away other types of MS-originated traffic with low usage of processing power avoids another re-start.

It will be appreciated that Applicants' invention is not limited to systems operating according to the specific communication standards or releases of the standards described above. Although references were made to Release 97 of the GPRS standards, Applicants' invention is also applicable to methods and apparatus operating according to other releases in which a BSSGP layer or the like exists at a Gb-interface or the like. In particular, although this application refers to TLLIs, it should be understood that the term "TLLI" is intended to encompass any data element or elements having the character of a temporary logical link identity that identifies a specific MS and that has the three main types discussed above.

It will also be appreciated that Applicants' invention may be used in a traditional circuit-switched network such as the circuit-switched portion of a UMTS, GSM, or similar network when packet bearers such as IP packets are used for circuit-switched sessions. Although such networks might not be considered traditional "circuit-switched networks" to the extent that they handle packet bearers, this terminology will be understood in this application to mean simply networks that are typical of traditional circuit-switched networks but that have been updated in that they handle packet bearers.

Applicants' invention is described above in connection with various embodiments that are intended to be illustrative, not restrictive. It is expected that those of ordinary skill in this art will modify these embodiments. The scope of Applicants' invention is defined by the following claims, and all modifications that fall within the scopes of these claims are intended to be included therein.

What is claimed is:

1. A method of handling messages at a node within a packet-switched communication system for avoiding overloading of a processor within said node, said messages transmitted by a plurality of subscriber stations being served by said node, comprising the steps of:
   a) receiving a message having an information element indicating the message's type;
   b) determining whether of the message type associated with said received message is a first type or a second type; and
   c) in response to a determination that the determined message type is the first type, processing the received message within said node;
   d) otherwise, in response to a determination that the determined message type is the second type,
      determining the total frequency of messages received by said node for said message type;
      determining whether the determined total frequency for said message type exceeds a threshold associated with said message type;
      handling the message in a normal way if the total frequency does not exceed the threshold; and
      discarding and not further processing the message by said node to avoid overloading the processor capacity if the total frequency exceeds the threshold;
   wherein the method is carried out by a serving general packet radio service support node (SGSN) after the SGSN is re-started or by a base station system (BSS) after the BSS is re-started.

2. The method of claim 1, wherein the information element is a local temporary logical link identity associated with a particular one of said plurality of subscriber stations.

3. The method of handling messages at a node in a packet-switched communication system to avoid overloading processor capacity within said node, said messages transmitted by a plurality of subscriber stations being served by said node, comprising the steps of:
   receiving an uplink message and reading an information element in a header of the received message;
   accessing a table based on the read information element to determine a status of the read information element as either already known or unknown to said node;
   based on the table access, handling the message in a normal way if the information element is known within said node, and
   otherwise carrying out the following steps:
      updating a frequency of receipt of unknown read information elements;
      comparing the updated frequency to a threshold predefined within said node,
      if the updated frequency is less that the threshold, handling the message in the normal way, and
      otherwise carrying out the following steps:
         determining whether the read information element is of a predetermined type;
         if the read information element is not of the predetermined type, handling the message in the normal way, and
         if the read information element is of the predetermined type, discarding the message to avoid overloading the processor capacity;

wherein the method is carried out by a serving general packet radio service support node (SGSN) after the SGSN is re-started or by a base station system (BSS) after the BSS is re-started.

4. The method of claim 3, wherein the the information element is a temporary logical link identity.

5. The method of claim 3, wherein the threshold is based on processing resources available in the serving general packet radio service support node (SGSN) for handling messages.

6. A method of claim 5, wherein the processing resources comprise at least one of an amount of free memory left to the SGSN and a load on a central processing unit of the SGSN.

7. The method of claim 3, further comprising the steps of determining whether the message includes a second information element that is encrypted, the determining step being carried out if the updated frequency does not exceed the threshold and before handling the message in the normal way, and if the second information element is, not encrypted, handling the message in the normal way, but if the second information element is encrypted, discarding the message.

8. The method of claim 3, wherein the information element is not of the predetermined type, a frequency of receipt of messages having information elements of another type is compared to a second threshold, and if the second threshold is not exceeded, the message is handled in the normal way, but if the second threshold is exceeded, the message is discarded.

9. The method of claim 8, further comprising the steps of determining whether the message includes a second information element that is encrypted, the determining step being carried out if the frequency does not exceed the second threshold and before handling the message in the normal way, and if the second information element is not encrypted, handling the message in the normal way, but if the second information element is encrypted, discarding the message.

* * * * *

UNITED STATES PATENT AND TRADEMARK OFFICE
CERTIFICATE OF CORRECTION

PATENT NO. : 7,466,983 B2  Page 1 of 1
APPLICATION NO. : 09/943211
DATED : December 16, 2008
INVENTOR(S) : Hoff et al.

It is certified that error appears in the above-identified patent and that said Letters Patent is hereby corrected as shown below:

In Column 10, Line 14, in Claim 1, after "whether" delete "of".

In Column 10, Line 56, in Claim 3, delete "node," and insert -- node; --, therefor.

In Column 10, Line 57, in Claim 3, delete "that" and insert -- than --, therefor.

In Column 11, Line 5, in Claim 4, delete "the" before "information".

In Column 11, Line 10, in Claim 6, delete "A" and insert -- The --, therefor.

Signed and Sealed this

Twenty-sixth Day of May, 2009

JOHN DOLL
*Acting Director of the United States Patent and Trademark Office*